June 18, 1963   M. E. KENNEY ETAL   3,094,535
GERMANIUM PHTHALOCYANINES
Filed Jan. 3, 1961                    2 Sheets-Sheet 1

INVENTOR.
MALCOLM E. KENNEY
BY RALPH D. JOYNER
Schramm, Kramer & Sturges
ATTORNEYS.

June 18, 1963 M. E. KENNEY ETAL 3,094,535
GERMANIUM PHTHALOCYANINES
Filed Jan. 3, 1961 2 Sheets-Sheet 2

INVENTOR.
MALCOLM C. KENNEY
BY RALPH D. JOYNER

Schramm, Kramer & Sturges
ATTORNEYS.

United States Patent Office 3,094,535
Patented June 18, 1963

3,094,535
GERMANIUM PHTHALOCYANINES
Malcolm E. Kenney, % Case Institute of Technology, University Circle, Cleveland, Ohio, and Ralph D. Joyner, Maple Heights, Ohio (544 Roslyn Ave., Akron, Ohio)
Filed Jan. 3, 1961, Ser. No. 80,226
6 Claims. (Cl. 260—314.5)

This invention relates, as indicated, to certain phthalocyanine compounds, and more particularly to those phthalocyanine compounds which contain the metal germanium in the molecule.

Among the organic pigmentary materials, there are perhaps none so stable as the metal derivatives of phthalocyanine and its related compounds. Copper phthalocyanine is, of course, very well known and widely used as a pigmentary material. However, copper phthalocyanine and other metal containing phthalocyanines are generally bivalent metal materials. Because of the lack of available valence bonds in such materials, it is not possible to exercise the measure of control which is possible with a material, such as tetravalent germanium. Advantage may thus be taken of the inorganic functionality of the material. Use is also made of hexacoordination possessed by germanium. These materials are believed to be entirely new and possess a remarkable degree of stability. By virtue of their stability, the germanium derivatives are especially useful as pigmentary materials for use in paints and enamels.

Tin and lead phthalocyanines have been known for some time, but the specific germanium phthalocyanines have not been described anywhere in the literature. The germanium phthalocyanines are important because few metal phthalocyanines are known in which the central element has as large an electronegativity as germanium, but also because they provide an opportunity for the study of germanium when it is bound to 6 atoms, of which 4 are nitrogen that can be assumed to be in a planar arrangement. Due to the great stability of the phthalocyanine ring system, this unusual predetermined hexacoordination for germanium is preserved under a wide variety of conditions.

The germanium phthalocyanines have been found notable also in that they exhibit a functionality associated with the two non-ring atoms bonded to the germanium— a kind a functionality which is not fully utilized in the phthalocyanine industry. The use of this inorganic functionality in synthesizing a series of metal substituted germanium phthalocyanines, and the exploitation of the stable phthalocyanine ring for controlling the number and positions of atoms surrounding the germanium are more particularly described hereinafter.

Figure 1:
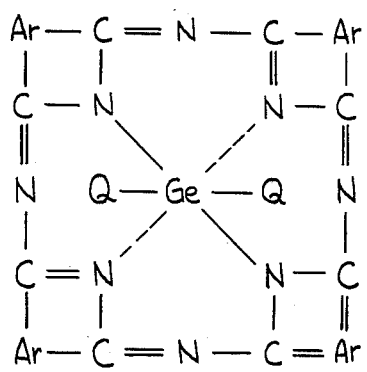
FIG. 1 is a general structural formula for germanium phthalocyanine compounds contemplated in accordance herewith.

It should be noted that in FIGS. 1 to 5 inclusive, the lower right hand ring structure is not in the true sense of the word an arylene or aromatic group, being more properly quinoid. For the purposes of this specification, however, all four groups, Ar, will be discussed as if they were all aromatic, since the only significant difference is in the bonding to the balance of the molecule. It should be noted that the structure drawn for the macrocyclic ring is one of the contributing structures of the resonance hybrid structure, which it is theorized represents the ring system. The distribution of charge throughout similar parts of the ring system is presumed to be the same. Thus all of the equivalent small ring systems making up the macrocycle possess equal aromatic character. The nomenclature is in accordance with conventional practice in the phthalocyanine field.

Briefly stated, then, the present invention is directed to a new class of chemical compounds which are germanium phthalocyanines. The general formula given in FIG. 1 above, wherein Ar is an aromatic radical, and Q is a group capable of bonding to germanium, and may be selected from the group consisting of for example halogen, e.g. chlorine, bromine, iodine, and fluorine; aroxy and thioaroxy, e.g. phenoxy and thiophenoxy; alkoxy and thioalkoxy, e.g. methoxy and thiomethoxy; cycloalkoxy and thiocycloalkoxy, e.g. cyclohexoxy and thiocyclohexoxy; siloxy, for example triarylsiloxy and trialkylsiloxy and hydroxy-aryl siloxy and hydroxy alkyl siloxy, e.g. diphenyl hydroxy siloxy and dimethyl hydroxy siloxy; hydroxy and mercapto. The aromatic radicals, Ar, are in most instances phenylene, but may be naphthalene, anthracene, or any of the substituted arylene radicals of which the prior art is well aware. Examples of such substituted arylene radicals include, for example, chlorinated phenylene, sulphonated phenylene, nitrated phenylene, aroxy phenylene, alkoxy phenylene, etc. as hereinafter more specifically exemplified.

It becomes convenient at this point to illustrate by specific examples, the preparation of new chemical compounds in accordance with the present invention. It is to be understood that these examples are for illustrative purposes only and not to be construed as limiting the invention to the precise methods of compounds described therein.

EXAMPLE I

*Dichlorogermanium phthalocyanine.*—A mixture of 20 grams (0.094 mole) of germanium tetrachloride and 50 grams (0.39 mole) of phthalonitrile were placed in 100 ml. of quinoline and brought very slowly to reflux with constant stirring. Heating and stirring were continued at 240° C. for four hours. The reaction mixture was filtered hot and the solid product extracted in a Soxhlet extractor with successive portions of dimethylformamide, xylene and acetone. The yield was approximately 50% based on the germanium tetrachloride.

Purification of the production was effected by heating a 300 mg. sample, covered with platinum gauze, in a vacuum sublimator at 450–460° for two hours under a pressure of 2 microns. The collecting finger of the sublimator was maintained at 357° C. by mercury held at reflux with an independent heat source. A yield of 75 mg. of crystals which under microscopic examination were uniform in size, shape and color was obtained. These crystals were blue-green by transmitted light and had a reddish reflux. Germanium was determined by conversion to the oxide. The product had an empirical formula $C_{32}H_{16}N_8GeCl_2$, a calculated molecular weight of 656.05. The theoretical analysis for such a product is carbon 58.59%; hydrogen 2.46%; germanium 11.07%; and chlorine 10.81%. The actual amounts of these elements found were as follows: carbon 58.70%; hydrogen 2.67%; germanium 11.1%; and chlorine 10.65%. This product had a structural formula corresponding to FIG. 2.

EXAMPLE II

Another method of preparing the product of Example I above is by reacting in a mole ratio of 1:4, $GeCl_4$ and orthocyanobenzamide in 1-chloronaphthalene at reflux for about 4 hours, and filtering the resultant crystalline material. The product is easily cleaned by washing with cold water. Purification can again be effected with a vacuum sublimator.

EXAMPLE III

Figure 3:
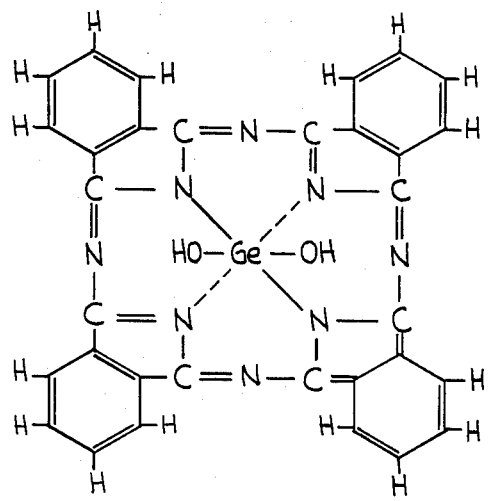
FIG. 3 is a structural formula for dihydroxy germanium phthalocyanine.

*Dihydroxygermanium phthalocyanine.*—Hydrolysis of the dichloride was slow with water, refluxing concentrated ammonia, live steam, and refluxing pyridine. However, a 300 mg. sample of the sublimed dichloride was hydrolized completely with 20 ml. of refluxing 1:1 pyridine-concentrated ammonia solution in six hours. The blue hydroxide was not hygroscopic and dried completely at 110° C. This product had an empirical formula $C_{32}H_{18}N_8GeO_2$, a calculated molecular weight of 619.11, and a structural formula as shown in FIG. 3. The theoretical analysis for this material was carbon 62.08%; hydrogen 2.93%; nitrogen 18.10%. The amounts of these elements actually found were as follows: carbon 62.88%; hydrogen 2.96%; and nitrogen 17.74%.

Treatment of the dichloride with concentrated sulfuric acid gave, after dilution and washing, dihydroxy-germanium phthalocyanine which was apparently uncontaminated with metal-free phthalocyanine.

EXAMPLE IV

Figure 4:
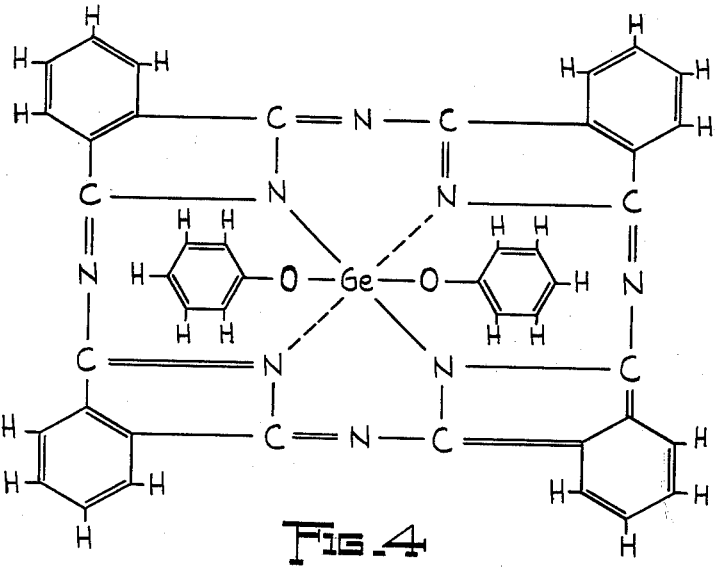
FIG. 4 is a structural formula for di-phenoxy germanium phthalocyanine.

*Diphenoxygermanium phthalocyanine.*—Reaction of 1 gram (0.0016 mole) of dihydroxygermanium phthalocyanine, the intermediate produced in accordance with Example III above, and 1.5 gram (0.016 mole) of phenol in 50 ml. of refluxing benzene for three hours produced crystalline diphenoxygermanium phthalocyanine in very high yield. A 400 mg. sample of this product was heated at 385° C. for 2.5 hours under a pressure of 2 microns in a sublimator equipped with an air cooled cold finger. A band of 17 mg. of uniform air stable crystals which were blue-green by transmitted light and reddish by reflected light was obtained. This product had a structural formula as shown in FIG. 4 in the drawings and an empirical formula $C_{44}H_{26}N_8GeO_2$ and a calculated molecular weight of 771.35. The theoretical analysis for this product is carbon 68.51%; hydrogen 3.40%; nitrogen 14.53%; germanium 9.41%. The amounts actually found in analysis were: carbon 68.37%; hydrogen 3.46%; nitrogen 14.63%; and germanium 9.18%.

EXAMPLE V

*Bis-p-phenylphenoxy germanium phthalocyanine.* — A mixture of 2.8 grams (0.016 mole) of p-phenylphenol and 1.0 gram (0.0016 mole) of the dihydroxide intermediate produced in accordance with Example III above in 50 ml. of refluxing benzene gave a high yield of crystalline bis-p-phenylphenoxy-germanium phthalocyanine after three hours. A 300 mg. sample heated at 355° C. for 3.5 hours at a vacuum of 2 microns yielded a ring of 17 mg. of uniform air stable crystals blue-green by transmitted and reddish by reflected light. This product had an empirical formula of $C_{56}H_{34}N_8GeO_2$, and a calculated molecular weight of 923.49. The theoretical analysis for this product is carbon 72.83%; hydrogen 3.71%; and nitrogen 12.13%. The amounts of these elements actually found upon analysis were carbon 72.93%; hydrogen 3.96%; nitrogen 11.77%.

EXAMPLE VI

Figure 5:
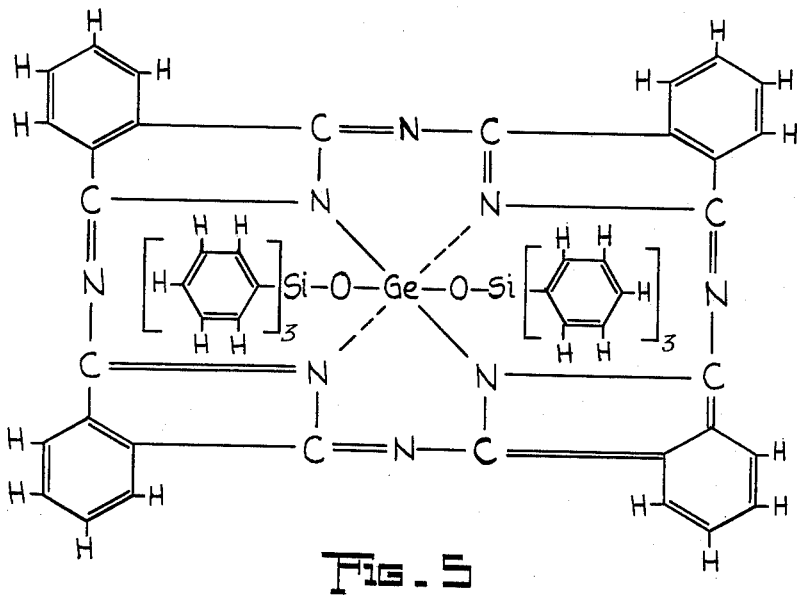
FIG. 5 is a structural formula for bis-triphenylsiloxy germanium phthalocyanine.

*Bis triphenylsiloxy germanium phthalocyanine.* — A mixture of 4.5 grams (0.016 mole) of triphenylsilanol and 1.0 gram (0.0016 mole) of the dihydroxide intermediate produced in accordance with Example III above were reacted in refluxing benzene in three hours to give an almost quantitative yield of bis-triphenylsiloxy germanium phthalocyanine. A 500 mg. sample of it heated at 390° C. for 2 hours at a pressure of 2 microns gave 20 mg. of homogeneous air stable crystals which were blue-green by transmitted and reddish by reflected light. This product had a structural formula as shown in FIG. 5 of the drawings, an empirical formula $C_{68}H_{46}N_8GeSi_2O_2$, and a calculated molecular weight of 1135.83. The theoretical analysis for this material is carbon 71.90%; hydrogen 4.07%; nitrogen 9.87%. Upon analysis, this product was found to contain 71.52% carbon 4.08%; and nitrogen 9.71%.

The infrared spectrum of each of the foregoing compounds is characteristic and cannot in any case be ascribed to a mere mixture of reactants. Absorptions very near 700 cm.$^{-1}$ are found in the spectra of the phenoxy (700 cm.$^{-1}$). p-Phenylphenoxy (705 cm.$^{-1}$) and siloxy compounds (702 cm.$^{-1}$). These absorptions may be attributed to the presence of monosubstituted benzenes. The nearest absorption for the dichloride is at 690 cm.$^{-1}$ while the dihydroxide has none in the immediate neighborhood. Since all of the compounds show absorptions at 770–730 cm.$^{-1}$, this region cannot be used to further confirm the presence of monosubstituted benzene rings. Only two of the compounds have peaks in the 1270–1230 cm.$^{-1}$ area (1260 cm.$^{-1}$ for the phenoxy and 1250 cm.$^{-1}$ for the p-phenylphenoxy derivative). These absorptions may be due to the CO link. The dihydroxide, dichloride, p-phenyl phenoxide and siloxide all show similar absorption in the aromatic CH stretching region; however in keeping with the low percentage of hydrogen this absorption is not particularly strong. The dihydroxide shows a strong peak near 3500 cm$^{-1}$ which is undoubtedly due to OH stretching. When the dihydroxide is heated it does not volatilize, but it does change color slightly.

Figure 2:
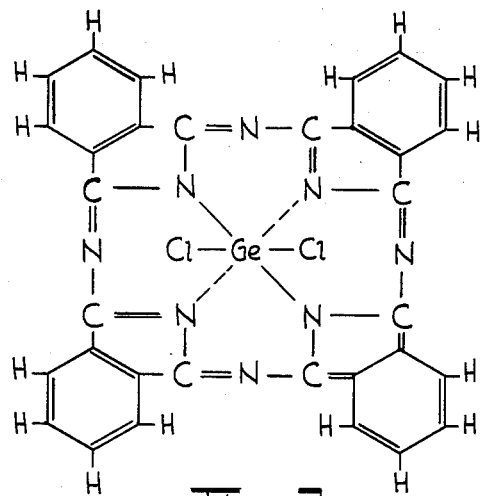
FIG. 2 is a structural formula for dichloro germanium phthalocyanine.

Several simple derivatives of the basic germanium phthalocyanine system have been illustrated above, and, as will now be evident to those skilled in the art, numerous other analogues may be made starting with either the halide intermediate, such as that specifically shown in FIG. 2 and produced in accordance with Example I, or the dihydroxy derivative of Example III and shown in FIG. 3. The ability to make substitutions upon the nuclear germanium atom to produce a substitution product whether symmetrically or asymmetrically permits control of properties of the final product.

Not only may the properties of the final product be controlled by the nature of the substituent groups on the germanium, control may also be exercised by variations in the aromatic radical. Thus, the aromatic radical, Ar (FIG. 1) may be monocyclic as phenylene or substituted phenylene, or polycyclic as in naphthylene or substituted naphthylene; for example, dichlorogermanium naphthalocyanine, dichlorogermanium tetra (4) chlorophthalocyanine, dichlorogermanium chloronaphthalocyanine, dichlorogermanium tetra (4)-benzoylphthalocyanine, dihydroxygermanium-4-cetoxyphthalocyanine, dihydroxy germanium tetra (4) α-naphthoxy phthalocyanine, dichlorogermanium-tetra (4) sulphophthalocyanine, dichlorogermanium-tetra (4) nitrophthalocyanine, dihydroxy germanium-tetra (4) thio-methoxy phthalocyanine, dichlorogermanium-tetra (3) thiododecoxy phthalocyanine, bis (diphenyl hydroxy siloxy) germanium phthalocyanine, etc.

These materials are especially useful as pigments in paints, enamels and textile printing compositions according to conventional procedures for utilizing pigments. For the most part, these pigmentary materials are dark blue or blue-green, some having a reddish cast by reflected light. Properties, such as, dispersability, color stability, etc. may be affected by selection of the substituent groups attached either to the metal atom, or to the arylene groups.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:
1. Dihalogen germanium phthalocyanine.
2. Dichloro germanium phthalocyanine.
3. Dihydroxy germanium phthalocyanine.
4. Di-phenoxy germanium phthalocyanine.
5. Bis-(p-phenylphenoxy) germanium phthalocyanine.
6. Bis-triphenylsiloxy germanium phthalocyanine.

References Cited in the file of this patent

Venkataraman: Synthetic Dyes, vol. II, Academic Press, New York (1952) page 1127.

Rochow et al.: The Chemistry of Organometallic Compounds, Wiley, New York (1957), pages 6, 9, 11, 17 and 182.